US008674855B2

(12) United States Patent
Monro

(10) Patent No.: US 8,674,855 B2
(45) Date of Patent: Mar. 18, 2014

(54) IDENTIFICATION OF TEXT

(75) Inventor: Donald Martin Monro, Beckington (GB)

(73) Assignee: Essex PA, L.L.C., Wilmington, DE (US)

( * ) Notice: Subject to any disclaimer, the term of this patent is extended or adjusted under 35 U.S.C. 154(b) by 1171 days.

(21) Appl. No.: 11/332,777

(22) Filed: Jan. 13, 2006

(65) Prior Publication Data
US 2007/0164882 A1 Jul. 19, 2007

(51) Int. Cl.
*H03M 7/00* (2006.01)
*G06F 17/22* (2006.01)
*G06F 17/30* (2006.01)

(52) U.S. Cl.
USPC ............................................ 341/50; 704/736

(58) Field of Classification Search
USPC ....................... 707/3–6, 9, 10; 726/31, 32, 33; 382/100; 341/50, 63
See application file for complete search history.

(56) References Cited

U.S. PATENT DOCUMENTS

| 4,168,513 | A | 9/1979 | Hains et al. |
| 4,509,038 | A | 4/1985 | Hirano |
| 4,558,302 | A | 12/1985 | Welch |
| 4,675,809 | A | 6/1987 | Omoda |
| 4,899,148 | A | 2/1990 | Sato et al. |
| 4,908,873 | A | 3/1990 | Philibert et al. |
| 5,218,435 | A | 6/1993 | Lim et al. |
| 5,315,670 | A | 5/1994 | Shapiro |
| 5,321,776 | A | 6/1994 | Shapiro |
| 5,412,741 | A | 5/1995 | Shapiro |
| 5,559,931 | A | 9/1996 | Shindou et al. |
| 5,635,932 | A | 6/1997 | Shinagawa et al. |
| 5,699,121 | A | 12/1997 | Zakhor et al. |
| 5,748,786 | A | 5/1998 | Zandi et al. |
| 5,754,704 | A | 5/1998 | Barnsley et al. |
| 5,768,437 | A | 6/1998 | Monro et al. |
| 5,819,017 | A | 10/1998 | Akeley et al. |

(Continued)

FOREIGN PATENT DOCUMENTS

| CN | 101385026 A | 3/2009 |
| CN | 101496290 B | 10/2012 |

(Continued)

OTHER PUBLICATIONS

Cancedda et al., Word Sequence Kernels, Mar. 2003, MIT Press, Journal of Machine Learning Research, vol. 3 Special Edition, pp. 1059-1082.*

(Continued)

*Primary Examiner* — Howard Williams
(74) *Attorney, Agent, or Firm* — Sterne, Kessler, Goldstein & Fox PLLC

(57) ABSTRACT

A method for determining whether portions of text have been copied during electronic copying, photocopying, or scanning of a document. The method comprises generating a target code from a target passage of the text, determining whether a sample passage of text includes the target code, and, upon successful determination, initiating an action if the sample passage of text includes the target code. A method of generating a code representative of a passage of text uses a spacing between respective occurrences of one or more key symbol strings within the text. By comparing the known code of a target text passage with the code generated from a sample text passage, it is easy to determine whether the target text has been used within the sample. The method may be integrated within a copying device.

37 Claims, 1 Drawing Sheet

(56) References Cited

U.S. PATENT DOCUMENTS

| | | | |
|---|---|---|---|
| 5,873,076 A * | 2/1999 | Barr et al. .................... | 707/3 |
| 5,956,429 A | 9/1999 | Burns | |
| 6,029,167 A * | 2/2000 | Evans ........................ | 707/4 |
| 6,052,416 A | 4/2000 | Koga | |
| 6,078,619 A | 6/2000 | Monro et al. | |
| 6,086,706 A * | 7/2000 | Brassil et al. ............ | 382/100 |
| 6,125,348 A | 9/2000 | Levine | |
| 6,144,835 A * | 11/2000 | Inoue et al. ............ | 399/366 |
| 6,208,744 B1 * | 3/2001 | Ishige et al. ............ | 382/100 |
| 6,336,050 B1 | 1/2002 | Amin et al. | |
| 6,434,542 B1 | 8/2002 | Farmen et al. | |
| 6,480,547 B1 | 11/2002 | Chen et al. | |
| 6,489,902 B2 | 12/2002 | Heath | |
| 6,522,785 B1 | 2/2003 | Kondo et al. | |
| 6,549,148 B2 | 4/2003 | Satoh | |
| 6,556,719 B1 | 4/2003 | Monro | |
| 6,563,438 B2 | 5/2003 | Satoh | |
| 6,625,213 B2 | 9/2003 | Bottreau et al. | |
| 6,654,503 B1 | 11/2003 | Sudharsanan et al. | |
| 6,661,839 B1 | 12/2003 | Ishida et al. | |
| 6,810,144 B2 | 10/2004 | McGee et al. | |
| 6,820,079 B1 * | 11/2004 | Evans ........................ | 707/4 |
| 6,847,966 B1 | 1/2005 | Sommer et al. | |
| 6,985,965 B2 | 1/2006 | Hannu et al. | |
| 6,990,145 B2 | 1/2006 | Monro et al. | |
| 7,003,039 B2 | 2/2006 | Zakhor et al. | |
| 7,079,986 B2 | 7/2006 | Sieracki | |
| 7,230,551 B2 | 6/2007 | Moriya et al. | |
| 7,586,424 B2 | 9/2009 | Monro | |
| 2002/0069206 A1 | 6/2002 | Bergman et al. | |
| 2002/0071594 A1 | 6/2002 | Kool et al. | |
| 2003/0058943 A1 | 3/2003 | Zakhor et al. | |
| 2003/0108101 A1 | 6/2003 | Frossard et al. | |
| 2004/0028135 A1 | 2/2004 | Monro | |
| 2004/0126018 A1 | 7/2004 | Monro | |
| 2004/0165737 A1 | 8/2004 | Monro | |
| 2004/0218836 A1 * | 11/2004 | Kanatsu ..................... | 382/305 |
| 2005/0149296 A1 | 7/2005 | Sieracki | |
| 2007/0016414 A1 | 1/2007 | Mehrotra et al. | |
| 2007/0030177 A1 | 2/2007 | Monro | |
| 2007/0053434 A1 | 3/2007 | Monro | |
| 2007/0053597 A1 | 3/2007 | Monro | |
| 2007/0053603 A1 | 3/2007 | Monro | |
| 2007/0252733 A1 | 11/2007 | Thebault et al. | |
| 2007/0258654 A1 | 11/2007 | Monro | |
| 2007/0271250 A1 | 11/2007 | Monro | |
| 2007/0290898 A1 | 12/2007 | Monro | |
| 2007/0290899 A1 | 12/2007 | Monro | |
| 2008/0005648 A1 | 1/2008 | Monro | |
| 2008/0055120 A1 | 3/2008 | Monro | |
| 2008/0056346 A1 | 3/2008 | Monro | |
| 2008/0084924 A1 | 4/2008 | Monro | |
| 2008/0086519 A1 | 4/2008 | Monro | |

FOREIGN PATENT DOCUMENTS

| | | |
|---|---|---|
| CN | 101501999 B | 2/2013 |
| EP | 0 595 599 A2 | 5/1994 |
| EP | 0 836 325 A1 | 4/1998 |
| EP | 1 545 010 A1 | 6/2005 |
| EP | 1 610 560 A | 12/2005 |
| EP | 1 974 298 B1 | 8/2011 |
| GB | 2 293 733 A | 4/1996 |
| GB | 2 409 943 A | 7/2005 |
| JP | 11-110414 | 4/1999 |
| JP | 2000-253241 | 9/2000 |
| JP | 2009-524131 A | 6/2009 |
| JP | 2009-540670 A | 11/2009 |
| JP | 2009-542094 A | 11/2009 |
| KR | 2009-0009775 A | 1/2009 |
| KR | 2009-0035494 A | 4/2009 |
| KR | 2009-0042775 A | 4/2009 |
| KR | 2011-0010668 A | 2/2011 |
| WO | WO97/16029 | 5/1997 |
| WO | WO98/11730 | 3/1998 |
| WO | WO99/08449 | 2/1999 |
| WO | WO01/15456 | 3/2001 |
| WO | WO01/63935 | 8/2001 |
| WO | WO02/13538 | 2/2002 |
| WO | WO2004/051863 | 6/2004 |
| WO | WO2005/027049 | 3/2005 |
| WO | WO 2005/064799 | 7/2005 |
| WO | WO 2005/067661 | 7/2005 |
| WO | WO2005/119581 | 12/2005 |
| WO | WO2007/030702 | 3/2007 |
| WO | WO2007/030784 | 3/2007 |
| WO | WO2007/030785 | 3/2007 |
| WO | WO2007/030788 | 3/2007 |
| WO | WO 2007/084336 | 7/2007 |
| WO | WO 2007/084336 A2 | 7/2007 |
| WO | WO 2007/118220 | 10/2007 |
| WO | WO 2007/145875 | 12/2007 |
| WO | WO 2007/145875 A2 | 12/2007 |
| WO | WO 2007/149358 | 12/2007 |
| WO | WO 2007/149383 | 12/2007 |
| WO | WO 2007/149384 | 12/2007 |
| WO | WO 2007/149384 A2 | 12/2007 |
| WO | WO 2008/027450 | 3/2008 |
| WO | WO 2008/030426 | 3/2008 |
| WO | WO 2008/030426 A2 | 3/2008 |
| WO | WO/2008/045280 | 4/2008 |
| WO | WO/2008/045281 | 4/2008 |
| WO | WO 2008/103321 A2 | 8/2008 |
| WO | WO 2008/103322 A2 | 8/2008 |

OTHER PUBLICATIONS

Schleimer et al., Data security and protection: Winnowing: local algorithms for document fingerprinting, 2003 ACM SIGMOD international conference on Management of data (SIGMOD '03), ACM Press, Jun. 2003, pp. 76-85.*

Brin et al., Copy detection mechanisms for digital documents, Proceedings of the 1995 ACM SIGMOD international conference on Management of data SIGMOD '95, vol. 24 ACM Press, May 1995, pp. 398-409.*

Brin et al., Copy detection mechanisms for digital documents, Proceedings of the 1995 ACM SIGMOD international conference on Management of data SIGMOD '95, Volumer 24 ACM Press, May 1995, pp. 398-409.

Cover et al. "Elements of Information Theory" Copyright Jon Wiley & Sons, Inc., p. 96, 1991.

Czerepinski et al., "Matching Pursuits Video Coding: Dictionaries and Fast Implementation" IEEE Trans Circuit Systems Video Technology, vol. 10, No. 7, pp. 1103-1115, Oct. 2000.

Daubechies, "Orthonormal Bases of Compactly Supported Wavelets" Comm. Pure Appl. Math., vol. 41 pp. 909-996, 1998.

De Natale, et al., "A Mesh-Interpolation Scheme for Very-Low Bitrate Coding of Video Sequences" European Transactions on Telecommunications, vol. 9, No. 1, pp. 47-55, 1998.

De Vleeschouwer et al., "Subband dictionaries for low-cost matching pursuits of video residues," IEEE Transactions on Circuits and Systems for Video Technology, vol. 9, Issue 7, pp. 984-993, Oct. 1999.

Figueras et al., "Color Image Scalable Coding with Matching Pursuit" IEEE Int. Conference Acoustics Speech Signal Process, pp. III-53-III-56, May 2004.

Frossard et al., "High Flexibility Scalable Image Coding" Proceedings of VCIP 2003, Jul. 2003.

Gamito et al. "Lossles Coding of Floating Point Data with JPEG 2000 Part 10" Proceedings of the SPIE, SPIE, Bellingham, VA, US. vol. 5558, Aug. 2, 2004. pp. 276-287.

Golomb, S.W., "Run-length encodings" IEEE Trans Info Theory, Jul. 1966, 12(3):399-401.

Horst et al. "Mupcos: A multi-purpose coding scheme" Signal Processing: Image Communication 5, pp. 75-89, 1993.

Hosang, M., "A Character Elimination Algorithm for Lossless Data Compression" Data Compression Conference, Proceedings. DCC, IEEE Computer Society Press, Los Alamitos, CA, US, Apr. 2, 2002, pp. 1-10.

(56) References Cited

OTHER PUBLICATIONS

Huffman, David A., "A Method for the Construction of Minimum-Redundancy Codes," Pro. Inst. Radio Eng., 1952, 9 (40), pp. 1098-1101.

Hull, Jonathan J., "Document Image Matching and Retrieval with Multiple Distortion-Invariant Descriptors", International Association for Pattern Recognition Workshop on Document Analysis Systems, Series in Machine Perception and Artificial Intelligence, vol. 14, published by World Scientific Publishing Co. Pte. Ltd. 1995, pp. 379-396.

Jun-peng Bao et al., "A new text feature extraction model and its application in document copy detection" Machine Learning and Cybernetics, 2003, International Conference on Nov. 2-5, 2003 Piscataway, NJ, USA, IEEE, vol. 1, Nov. 2, 2003, pp. 82-87.

Larsson, N.J., "The Context Trees of Block Sorting Compression" In Proceedings of the IEEE Data Compression Conference, Snowbird, Utah, Mar. 30-Apr. 1, pp. 189-198. IEEE Computer Society Press, 1998.

Mallat et al., "Matching Pursuits with Time-Frequency Dictionaries" IEEE Trans. Signal Processing, vol. 41. No. 12, pp. 3397-3415, Dec. 1993.

Mallat, "A Theory for Multiresolution Signal Decomposition: The Wavelet Representation" IEEE Trans. Pattern Anal. Mach. Intel., vol. 11, No. 7, Jul. 1989.

Monro et al., "Alignment Blur in Coherently Averaged Images" IEEE Transactions on Signal Processing, vol. 4, No. 6, pp. 1596-1601, Jun. 1996.

Monro et al., "Bases for Low Complexity Matching Pursuits Image Coding" Dept. of Electron. & Electr. Eng., Bath Univ., UK, 2005. IEEE International Conference on Image Processing, Publication Date: Sep. 11-14, 2005. vol. 2, pp. 249-252.

Monro et al., "Improved Coding of Atoms in Matching Pursuits" IEEE Int. Conference. Image Processing, vol. 2, Sep. 2003.

Monro et al., "Visual Embedding of Wavelet Transformation Coefficients" IEEE International Conference Image Process, pp. 186-189, Sep. 2000.

Monro, "Basis Picking for Matching Pursuits Image Coding" IEEE International Conference on Image Processing, pp. 2495-2498, Sep. 2004.

Moschetti et al., "New Dictionary and Fast Atom Searching Method for Matching Pursuit Representation of Displaced Frame Difference" IEEE International Conference on Image Processing, pp. II-685-II-688, Sep. 2002.

Neff et al., "Matching Pursuit Video Coding—Part I: Dictionary Approximation" IEEE Trans. Circuits System Video Technology, vol. 12, No. 1, pp. 13-26, Jan. 2002.

Neff et al., "Very Low Bit-Rate Video Coding Based on Matching Pursuits" IEEE Trans. Circuits and Systems for Video Tech., vol. 7, No. 1, pp. 158-171, Feb. 1997.

Poh et al., "Comparison of Residual Compression Methods in Motion Compensated Video" IEEE Int. Workshop on Multimedia Signal Processing, pp. 109-112, Dec. 2002.

R. F. Rice, "Some Practical Universal Noiseless Coding Techniques," Jet Propulsion Laboratory, Pasadena, California, JPL Publication 79—22, Mar. 1979.

Ramchandran et al., "Best Wavelet Packet Bases in a Rate-Distortion Sense" IEEE Transactions on Signal Processing, vol. 2, No. 2, pp. 160-175, Apr. 1993.

Said et al., "A New, Fast, and Efficient Image Codec Based on Set Partitioning in Heirarchical Trees" IEEE Transactions on Circuits and Systems for Video Technology, vol. 6, No. 3, pp. 243-250, Jun. 1996.

Sayood, Khalid, "Introduction to Data Compression" Morgan Kaufmann Publishers Inc., San Francisco, CA, USA 1996, pp. 27-32.

Sayood, Khalid, "Introduction to Data Compression" Morgan Kaufmann Publishers Inc., San Francisco, CA, USA 1991, pp. 98-99.

Salomon, "Data Compression: the complete reference", Springer, pp. 32-33, 1998.

Schleimer et al., Data security protection: Winnowing: local algorithms for document fingerprinting, 2003 ACM SIGMOD international conference on Management of data (SIGMOD '03), ACM Press, Jun. 2003, pp. 76-85.

Shapiro, "Embedded Image Coding Using Zerotrees of Wavelet Coefficients" IEEE Transactions on Signal Processing, vol. 41, No. 12, pp. 3445-3462, Dec. 1993.

Steffen et al., "Theory of Regular M-band Wavelets Bases" IEEE Transactions on Signal Processing, vol. 41. No. 12, pp. 3497-3511, Dec. 1993.

Teuhola, J. "A Compression Method for Clustered Bit-Vectors" Information Processing Letters, Amsterdam, NL, vol. 7, No. 6, pp. 308-311, Oct. 1978.

Tian et al., "Image Data Processing in the Compressed Wavelet Domain" Proceedings of ICSP'96, pp. 978-981, 1996.

Tredwell et al., "A Sequential Vector Selection Algorithm for Controllable Bandwidth Motion Description Encoding" IEEE Sympos. Intell. Multimedia. Video & Speech Process, May 2001.

Trott et al. "Wavelets Applied to Lossless Compression and Progressive Transmission of Floating Point Data in 3-D Curvilinear Grids" IEEE Proceedings of the Visualization Conference, Oct. 27, 1996, pp. 385-388.

Yuan et al., "Improved Matching Pursuits Image Coding" IEEE International Conference on Acoustics, Speech and Signal Processing ICASSP 2005, pp. II-201-II-204, Mar. 2005.

Yuan et al., "Low Complexity Separable Matching Pursuits" IEEE Int. Conference Acoustics Speech Signal Process, pp. III-725-III-728, May 2004.

Donald Monro, U.S. Appl. No. 11/677,515, filed Feb. 21, 2007, entitled "Hierarchical Update Scheme for Extremum Location with Indirect Addressing".

Donald Monro, U.S. Appl. No. 11/678,004, filed Feb. 22, 2007, entitled, "Video Coding With Motion Vectors Determined by Decoder".

Donald Monro, U.S. Appl. No. 11/678,479, filed Feb. 23, 2007, entitled, "Video Coding With Embedded Motion".

Donald Monro, U.S. Appl. No. 11/777,256, filed Jul. 11, 2007.

Donald Monro, U.S. Appl. No. 11/677,511, filed Feb. 21, 2007, entitled "Hierarchical Update Scheme for Extremum Location".

Donald Monro, U.S. Appl. No. 11/777,239, filed Jul. 12, 2007.

Donald Monro, U.S. Appl. No. 11/777,230, filed Jul. 12, 2007.

Donald Monro, U.S. Appl. No. 11/777,130, filed Jul. 12, 2007.

Donald Monro, U.S. Appl. No. 11/777,144, filed Jul. 12, 2007.

Donald Monro, U.S. Appl. No. 11/777,122, filed Jul. 12, 2007.

Donald Monro, U.S. Appl. No. 11/777,100, filed Jul. 12, 2007.

Donald Monro, U.S. Appl. No. 11/777,081, filed Jul. 12, 2007.

Donald Monro, U.S. Appl. No. 11/777,022, filed Jul. 12, 2007.

Donald Monro, U.S. Appl. No. 11/776,786, filed Jul. 12, 2007.

Donald Monro, PCT Serial No. PCT/US2007/008861, filed Apr. 9, 2007, entitled "Motion Assisted Data Enhancement".

Donald Monro, PCT Serial No. PCT/US2008/002100, filed Feb. 19, 2008, entitled "Hierarchical Update Scheme for Extremum Location".

Donald Monro, PCT Serial No. PCT/US2008/002101, filed Feb. 19, 2008, entitled "Hierarchical Update Scheme for Extremum Location with Indirect Addressing".

International Search Report for Appln. No. PCT/US2007/013100 issued Jan. 14, 2008, 4pgs.

International Search Report for Appln. No. PCT/US2007/000759 issued Feb. 14, 2008, 7pgs.

International Search Report for Appln. No. PCT/US2007/014138 issued Oct. 29, 2007, 2 pgs.

International Search Report for Appln. No. PCT/US2007/014182 issued Jan. 18, 2008, 1 pg.

International Search Report for Appln. No. PCT/US2007/014181 issued Jan. 14, 2008.

Non-Final Office Action for U.S. Appl. No. 11/255,090, completed Feb. 2, 2008, mailed Feb. 6, 2008, 14pgs.

Non-Final Office Action for U.S. Appl. No. 11/332,777, completed Dec. 12, 2007, mailed Dec. 21, 2007, 4pgs.

Final Office Action for U.S. Appl. No. 11/425,142, completed Sep. 10, 2007, mailed Sep. 18, 2007, 9 pgs.

(56) References Cited

OTHER PUBLICATIONS

Non-Final Office Action for U.S. Appl. No. 11/425,142, completed Mar. 7, 2007, mailed Mar. 20, 2007, 8 pgs.
Non-Final Office Action for U.S. Appl. No. 11/470,611, completed Aug. 29, 2007, mailed Sep. 5, 2007, 6 pgs.
Written Opinion for Appln. No. PCT/US2007/000759 completed Feb. 14, 2007, mailed Feb. 25, 2008, 11pgs.
International Search Report for Patent Cooperation Treaty Appln. No. PCT/US2007/019034 issued Apr. 8, 2008, 2pgs.
Written Opinion for Patent Cooperation Treaty Appln. No. PCT/US2007/019034 completed Mar. 31, 2008, mailed Apr. 8, 2008, 7pgs.
Non-Final Rejection for U.S. Appl. No. 11/470,611, mailed on Jun. 30, 2008, 5 pgs.
Non-Final Rejection for U.S. Appl. No. 11/422,316, mailed on Jul. 3, 2008, 7 pgs.
Choog Soo Park et al., "Lost Motion Vector Recovery Algorithm," Circuits and Systems, IEEE International Symposium on London, vol. 3, 1994, pp. 229-232.
Final Office Action for U.S. Appl. No. 11/255,090, mailed Sep. 3, 2008, 11 pgs.
Non-Final Office Action for U.S. Appl. No. 11/425,142, mailed Sep. 16, 2008, 12 pgs.
International Search Report for Appln. No. PCT/US2008/002179, issued Aug. 20, 2008, 12 pgs.
Non-Final Office Action for U.S. Appl. No. 11/255,090, dated Dec. 15, 2008, 11 pgs.
International Search Report and Written Opinion for Appln. No. PCT/US2008/002101, dated Dec. 12, 2008, 13 pgs.
Cotter et al., "Application of Tree-Based Searches to Matching Pursuit," 2001 IEEE International Conference on Acoustics, Speech and Signal Processing, New York, NY, vol. 6, 7, May 2001, pp. 3933-3936.
Shoa et al., "Tree Structure Search for Matching Pursuit," Image Processing, 2005, vol. 3, 11, pp. 908-911.
Qiangsheng Liu et al., "A low-cost video encoder with matching pursuit," Intelligent Multimedia, Video and Speech Processing, May 2, 2001, pp. 502-505.
Yuan Yuan et al., "Improved Matching Pursuits Image Coding," Acoustics, Speech, and Signal Processing, 2005, vol. 2, 18, pp. 201-204.
International Search Report and Written Opinion for Appln. No. PCT/US2008/002100, dated Dec. 12, 2008, 14 pgs.
International Search Reportfor Appln. No. PCT/US2007/021302, dated Dec. 10, 2008, 5 pgs.
Haoxing Zhang et al., "A Hybrid Video Coder Based on H.264 with Matching Pursuits," Acoustics, Speech and Signal Processing, 2006, p. 889.
Yuan et al., "3D Wavelet Video Coding with Replicated Matching Pursuits," Sep. 11, 2005, Image Processing, pp. 69-72.
Monro et al., "Subband Adaptive Dictionaries for Wavelet/Matching Pursuits Image Coding," Oct. 8, 2006, Image Processing, p. 2136.
Chien-Kai et al., "Matching Pursuits Low Bit Rate Video Coding with Codebooks Adaptation," Jun. 5, 2000, Acoustics, Speech, and Signal Processing, pp. 408-411.
International Search Report for Appln. No. PCT/US2007/019297, dated Dec. 12, 2008, 5 pgs.
Non-Final Office Action for U.S. Appl. No. 11/422,316, mailed Dec. 4, 2008, 13 pgs.
Non-Final Office Action for U.S. Appl. No. 11/255,090, mailed Dec. 15, 2008, 15 pgs.
Final Office Action for U.S. Appl. No. 11/425,142, mailed Mar. 2, 2009, 18 pgs.
International Search Report for Appln. No. PCT/US2007/014181 issued Jan. 23, 2008, 1 pg.
David Salomon, "Data Compression: The Complete Reference," 1998, Springer, XP002464409, pp. 32-33.
Non-Final Office Action for U.S. Appl. No. 11/677,511, mailed Feb. 20, 2009, 23 pgs.
Non-Final Office Action for U.S. Appl. No. 11/677,515, mailed Feb. 25, 2009, 21 pgs.
English-Language Abstract for Japanese Patent Publication No. 11-110414, published Apr. 23, 1999; 1 page.
English-Language Abstract for Japanese Patent Publication No. 2000-253241, published Sep. 14, 2000; 1 page.
Rabiee et al., "Low-bit-rate Subband Image Coding with Matching Pursuits," Visual Communications and Image Processing, vol. 3309, 1998, pp. 875-880.
Rabiee et al., "Scalable Subband Image Coding with Segmented Orthogonal Matching Pursuit," Oct. 4, 1998, Image Processing, pp. 774-777.
Schmid-Saugeon et al., "Dictionary Design for Matching Pursuit and Application to Motion-Compensated Video Coding," 2004, IEEE Transactions on Circuits and Systems for Video Technology, pp. 880-886.
Final Rejection mailed Oct. 20, 2009 for U.S. Appl. No. 11/255,090, filed Oct. 19, 2005; 10 pages.
Pre-Brief Appeal Conference Decision mailed Apr. 21, 2010 for U.S. Appl. No. 11/255,090, filed Oct. 19, 2005; 2 pages.
Examiner's Answer to Appeal Brief mailed Sep. 7, 2010 for U.S. Appl. No. 11/255,090, filed Oct. 19, 2005; 12 pages.
Patent Board Decision mailed Jun. 18, 2013 for U.S. Appl. No. 11/255,090, filed Oct. 19, 2005; 5 pages.
Notice of Allowance mailed May 1, 2009 for U.S. Appl. No. 11/422,316, filed Jun. 5, 2006; 6 pages.
Notice of Allowance mailed Jul. 28, 2009 for U.S. Appl. No. 11/422,316, filed Jun. 5, 2006; 4 pages.
Notice of Allowance mailed Jan. 16, 2008 for U.S. Appl. No. 11/425,142, filed Jun. 19, 2006; 6 pages.
Notice of Allowance mailed May 16, 2008 for U.S. Appl. No. 11/425,142, filed Jun. 19, 2006; 7 pages.
Non-Final Rejection mailed Aug. 4, 2009 for U.S. Appl. No. 11/425,142, filed Jun. 19, 2006; 17 pages.
Final Rejection mailed Mar. 18, 2010 for U.S. Appl. No. 11/425,142, filed Jun. 19, 2006; 21 pages.
Pre-Brief Appeal Conference Decision mailed Sep. 17, 2010 for U.S. Appl. No. 11/425,142, filed Jun. 19, 2006; 2 pages.
Examiner's Answer to Appeal Brief mailed Feb. 24, 2011 for U.S. Appl. No. 11/425,142, filed Jun. 19, 2006; 24 pages.
Final Rejection mailed Jul. 2, 2009 for U.S. Appl. No. 11/677,511, filed Feb. 21, 2007; 24 pages.
Non-Final Rejection mailed Nov. 16, 2009 for U.S. Appl. No. 11/677,511, filed Feb. 21, 2007; 5 pages.
Notice of Allowance mailed Feb. 4, 2010 for U.S. Appl. No. 11/677,511, filed Feb. 21, 2007; 7 pages.
Notice of Allowance mailed Nov. 14, 2008 for U.S. Appl. No. 11/470,611, filed Sep. 6, 2006; 7 pages.
Notice of Allowance mailed Jan. 28, 2009 for U.S. Appl. No. 11/470,611, filed Sep. 6, 2006; 2 pages.
Final Rejection mailed Jul. 2, 2009 for U.S. Appl. No. 11/677,515, filed Feb. 21, 2007; 25 pages.
Non-Final Rejection mailed Nov. 12, 2009 for U.S. Appl. No. 11/677,515, filed Feb. 21, 2007; 5 pages.
Notice of Allowance mailed Feb. 12, 2010 for U.S. Appl. No. 11/677,515, filed Feb. 21, 2007; 7 pages.

* cited by examiner

IDENTIFICATION OF TEXT

CROSS-REFERENCE TO RELATED APPLICATION

None.

TECHNICAL FIELD

The present invention relates to the identification of text. In a preferred embodiment, it provides a mechanism in which a block of text may be quickly and easily checked to confirm the existence or absence within it of a target text passage.

BACKGROUND OF THE INVENTION

In recent years it has become more and more difficult for the author or copyright owner of a passage of text to control what happens to that text once it has been released into the public domain. If the text is released in electronic format, it can be repeatedly copied and distributed across the Internet in seconds. Even if it is released only in hardcopy, it is a trivial matter for a third party to copy or scan the relevant page and then to use optical recognition (OCR) technology to generate an electronic version.

There are a variety of circumstances where the need arises to detect when a particular passage of text has been copied. First, if the text passage is copyright protected, the copyright owner may legitimately wish to know who is making unlawful copies of the passage; alternatively, the copyright owner may be interested to know how many times an authorised licensee has made a copy, so that license royalties may be calculated. Second, there is a need to detect plagiarism, especially amongst students who may copy passages of text from the Internet, and pass them off their own work. Thirdly, there is the security field in which, for reasons of national security or otherwise, government agencies may wish to restrict or prohibit the copying of certain secret documents.

In all of these scenarios, it would be desirable to detect not only electronic copying, but also the copying of physical printed documents, for example by scanning or photocopying.

SUMMARY

A first embodiment of the present invention provides a method for determining whether portions of text have been copied during electronic copying, photocopying, or scanning of a document. The method comprises generating a target code from a target passage of the text, determining whether a sample passage of text includes the target code, and, upon successful determination, initiating an action if the sample passage of text includes the target code.

In one example, generating the target code comprises identifying a key symbol string from the target passage of the text, identifying positions at which the key symbol string occurs within the target passage of the text, determining distances between respective adjacent positions of the key symbol string within the target passage of the text, and generating the target code based on the key symbol string and the distances.

Another embodiment of the present invention provides a system, comprising an imaging device configured to generate an image of a document, a converting device configured to convert a portion of the image of the document into digital data, an analyzing device configured to generate a sample from the digital data and compare a target code with a portion of the sample, and a controller configured to initiate an action when the portion of the sample includes the target code.

DESCRIPTION OF THE DRAWINGS

The invention may be carried into practice in a number of ways, and several specific embodiments will now be described, by way of example, with reference to the accompanying drawings, in which.

DETAILED DESCRIPTION

Figure 1:
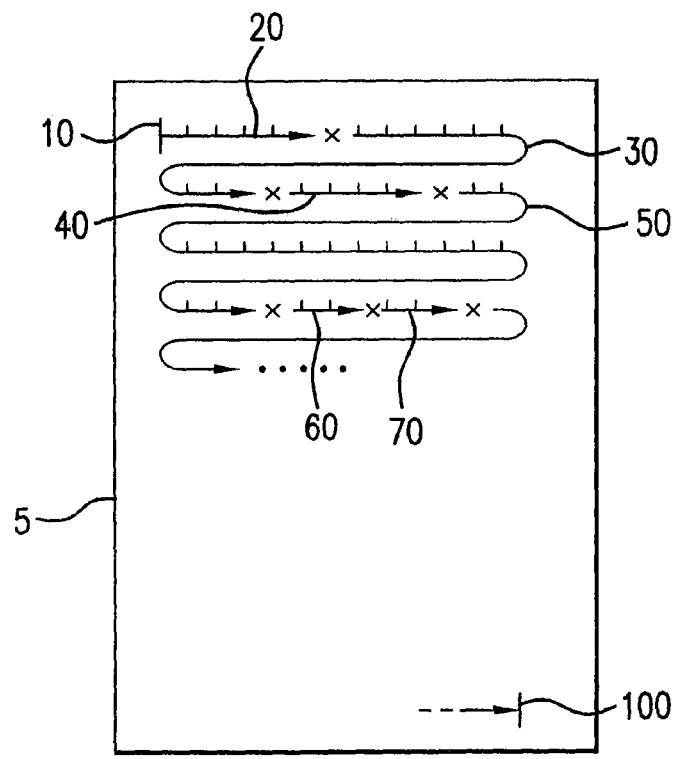
FIG. 1 shows an exemplary method for creating a code from a passage of text according to one embodiment of the present invention; and, FIG. 2 shows a copying device in accordance with another embodiment of the invention which can automatically detect when a given text passage has been copied.

The preferred procedure for creating a code indicative or representative of a passage of text 5 is illustrated schematically in FIG. 1. If the passage is not already in electronic format, it should first be scanned or otherwise copied and optical character recognition (OCR) applied.

First, a key symbol string is decided upon, this being one or more character strings which are going to be sought within the document. In the example of FIG. 1, a single key symbol string is used, namely the letter "x," Starting at the beginning 10 of the passage, one then searches through sequentially and notes each occurrence of the selected key symbol string. In the example shown, the first occurrence of the string "x" occurs in the $5^{th}$ character position after the start, as is indicated by the reference numeral 20. The letter "x" next occurs nine character spaces further on, as is indicated by the reference numeral 30.

As will be seen in the Figure, the block of text under consideration is treated as one long continuous string so that the character spacing between one key symbol string and the next is not affected by the way in which the text is laid out on the page: aside from one or two exceptions (described more fully below) the page layout is typically ignored.

Continuing with the example, the next letter "x" occurs five characters after the preceding one, as shown by reference numeral 40. Subsequent character spacings are 17, 3, 3, as respectively shown by the reference numerals 50, 60, 70.

Once the block of text has been fully parsed in this way down to the end 100, a code which is representative of the text is generated by combining details of the key symbol string or strings in use and a list made up of the character spacings between respective strings. The detailed structure of the code itself may be chosen according to the particular application in hand, but it may, for example, consist of a header portion which defines the string or strings, followed by the list of spacings. Using that approach, the text in FIG. 1 may be represented by the following code: X: 5, 9, 5, 17, 3, 3 . . . .

Typically, the distance measure will be the number of letters, symbols or other characters between the key symbol strings. The distance measure may also include single and/or multiple character spaces, or alternatively the presence or absence of spaces could be ignored.

More complex distance metrics are also envisaged, which may, if desired, make use of the way the text is presented on the page, including the way that the text may be laid out line by line. A variety of different metrics are envisaged in which, for example, the distance between symbols may depend not only upon the number of intermediate characters, but also whether the two symbols lie on the same line or different lines. If they lie on different lines, the number of lines in between could also be taken into consideration.

Given the text layout of FIG. 1, one could decide, for example, to use a distance metric in which each line break is deemed to be equivalent to a ten character spacing. With such a metric, one needs to add ten characters to the distance 30, and twenty characters to the distance 50, all other distances remaining the same. This gives one a new code: X: 5, 19, 5, 37, 3, 3 . . . .

In the simple embodiment of FIG. 1, a single key symbol string is used, namely the letter "x." In variants of the method, one may look for occurrences of more lengthy and/or complex strings. As described in more detail below, these may either be strings having a fixed, predefined form, or alternatively may be strings which have some inherent flexibility in form, length, and/or composition. The extent of the flexibility may be predefined or it may be calculated in dependence upon some characteristic or characteristics of the passage of text under study. Multiple key symbol strings may also be used: for example, it may be convenient for the string to be defined as either the letter "x" or the letter "q," without any distinction being made between the two.

Some further exemplary key symbol strings are set out below.

Exemplary Key Symbol Strings

Any letter, symbol or character a such as "x." This could in principle include a single-character space.

Any bigraph $a_1 a_2$ such as "st."

Any combination $a_1 a_2 a_3$ such as "str."

Any longer combination $a_1 a_2 a_3 \ldots a_n$ such as "st___ng" where the underscores represent single character spaces.

Any string of the form $s_1$ ? $s_2$ where $s_1$, $s_2$ are characters or combinations of characters as above, and ? represents a spacing of one or more characters which may be fixed or variable.

Any string of the form $s_1$ ? $s_2$ ? $s_3$ where $s_1$, $s_2$, $s_3$ are strings of any type mentioned above, and where the spacings represented by ? need not be the same.

Any string of the form $s_1$ ? $s_2$ ? $s_3$ ? $s_4$, where, again each ? may represent a different character spacing, and $s_1$, $s_2$, $s_3$, $s_4$, are strings of any of the above types.

A string in which two strings $s_s$, $s_e$ are separated by a given number of occurrences of a further string $s_f$ where the starting string $s_s$ the ending string $s_e$ and the further string $s_f$ are all of any of the types mentioned above. These strings may be the same or different, and the spacings between them may be fixed or variable.

A string in which $s_s$ and $s_e$ are separated by a selected number of occurrences of a plurality of further strings $s_1$, $s_2 \ldots s_n$. Again, the respective spacings may be fixed or variable and the strings may, but need not, all be different.

In order to determine whether a target passage of text is present within a sample passage, respective codes are generated for both passages, using the same criteria, and those codes are then compared. The target passage is determined to exist within the sample passage if a match is identified between the target code and some part of the sample code. The comparison may be made in any convenient way, for example by sliding the list from the target code along the length of the sample code list, and looking for a match at each position. Depending upon the application, an exact match may required, or alternatively it may be sufficient to accept a partial match according to some predefined minimum matching criteria.

Figure 2:
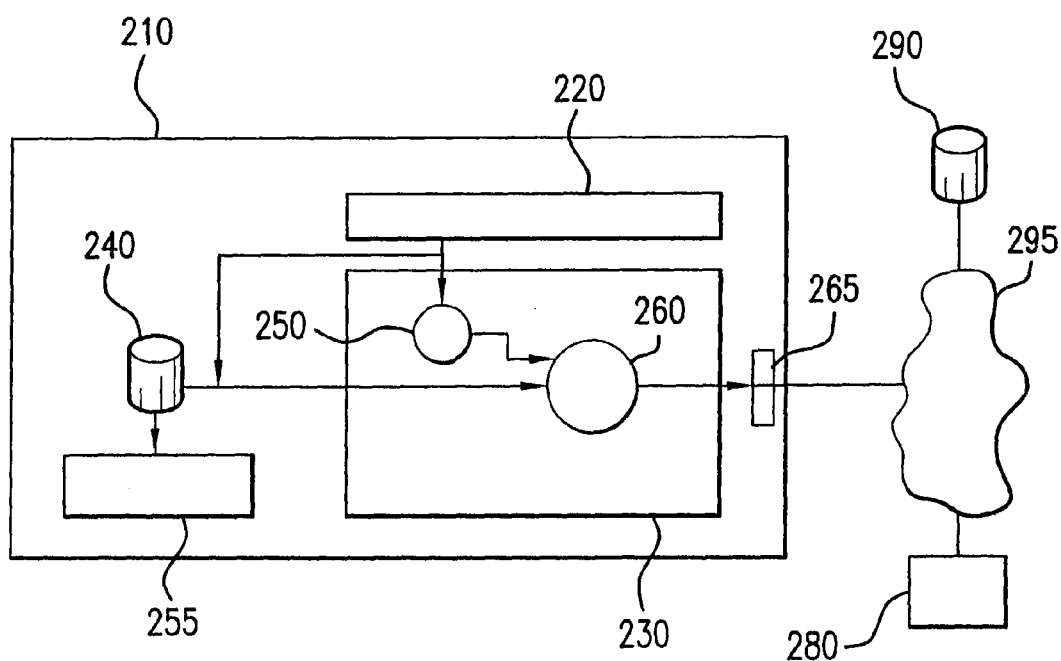

FIG. 2 shows how the preferred method of the present invention may be integrated within a copying device, such as a scanner or photocopier. The copying device 210 includes an imager 220 such as a CCD device, scanner or digital imager, the function of which is to capture a digital image of a hard copy document (not shown) bearing a passage of text. An image is passed to a computer processing unit 230, and may also be stored on a local hard disk or other storage means 240. If the copier is to produce physical copies, a printer 255 may be included. The image is passed to an OCR engine 250 which converts the passage into a character string and passes it onto an analyser 260. Where the distance metric in use requires information on the position of line breaks, or other layout information, that information is passed on as well. The analyser processes the passage and creates from it a sample code, using the method described above.

Recorded on the disk drive 240 are a series pre-computed target codes, each being representative of a passage of text the copying of which is to be noted. These should, of course, have been generated by the same algorithm that is being used by the analyser to generate the sample code. The analyser retrieves the stored codes from disk, and compares them (as described above) with the sample code that has been generated from the recently copied document. If a match is found, a controller 265 is instructed to take some appropriate action. That may include, for example, shutting the photocopier down, inhibiting the copying process, generating a visual or audible signal, writing an entry into a log which may then be stored on the disk 240, or sending a message across a network such as the Internet 270 to a remote system 280. The remote system may itself take whatever action is appropriate, including in some applications, raising an automated invoice in respect of the royalties required for photocopying a particular piece of copyright text.

Instead of the target codes being stored within the copier 210 itself, the codes may be stored remotely as shown at 290 with the copier automatically requesting the necessary information across the network whenever a copy is made.

An embodiment of the present invention provides a method of generating a code representative of a passage of text by identifying positions at which one or more key symbol strings occur within the passage of text, determining distances between selected occurrences and generating a code including said distances.

Another embodiment of the present invention provides a method for determining whether a target passage of text occurs within a sample passage of text by coding both the target passage and the sample passage with the same code as described above and comparing the target code with portions of the sample code. If the target code and a portion of the sample code match according to required matching criteria, the target passage of text is determined to occur within the sample passage.

Another embodiment of the present invention provides a copying device, for example a scanner, photocopier, camera or digital imager which includes suitable onboard processing to generate and analyze the codes described above.

Another embodiment of the present invention provides a system for making physical or electronic copies of a physical text document. The system includes an imager for generating an image of a physical document. The system converts the non-electronic text into sample text in electronic form using a converting device, such as an OCR engine. The system further includes an analyzer for generating a sample code from the sample text using distances between selected occurrences within the sample text of a key symbol string. The analyzer uses a plurality of pre-computed target codes that are representative of target text passages of interest and compares the target codes with portions of the sample code. If the target code and a portion of the sample code match according to required matching criteria, a signal is generated indicating that the target code and a portion of the sample code match. The system further includes a controller that will take some action upon receiving a signal that the target code and a portion of the sample code match.

According to one embodiment of the present invention the code indicative of a passage of text identifies the positions of occurrence of one or more key symbol strings in the text.

According to one embodiment of the present invention the code indicative of a passage of text determines the distances between the positions of selected occurrences of key symbol strings. According to one embodiment of the present invention the code indicative of a passage of text is formed including one or more distances between key symbol strings.

According to one embodiment of the present invention each key string is one chosen symbol.

According to one embodiment of the present invention the code comprises one or more symbols that are indicative of a key symbol string combined with one or more distances between one or more first chosen occurrences and one or more second chosen occurrences separated by a chosen number of other occurrences.

According to one embodiment of the present invention the code contains only one key string.

According to one embodiment of the present invention the code comprises one or more distances between one or more first chosen occurrences and one or more second chosen occurrences separated by a chosen number of other occurrences.

According to one embodiment of the present invention the separation of occurrences is fixed.

According to one embodiment of the present invention the separation is varying according to some predetermined pattern.

According to one embodiment of the present invention the separation is computed.

I claim:

1. A method for determining whether portions of text have been copied during electronic copying, photocopying, or scanning of a document, comprising:
    generating, using a processing device, a target code from a target passage of the text, wherein the generating the target code comprises:
        identifying a key symbol string from the target passage of the text,
        identifying a first position at which the key symbol string occurs within the target passage of the text,
        identifying a second position at which the key symbol string occurs within the target passage of the text, and
        determining a distance between the first position and the second position;
    determining, using the processing device, whether a sample passage of text includes the target code; and
    upon successful determination, initiating, using the processing device, an action if the sample passage of text includes the target code.

2. The method of claim 1, further comprising using a single fixed string of one or more characters as the key symbol string.

3. The method of claim 2, further comprising using a letter, a symbol, and/or a space as the one or more characters.

4. The method of claim 3, further comprising using different arrangements of the letter, the symbol, and/or the space as the one or more characters.

5. The method of claim 3, further comprising using identical arrangements of the letter, the symbol, and/or the space as the one or more characters.

6. The method of claim 1, further comprising using variable length strings of one or more characters as the key symbol string.

7. The method of claim 6, further comprising using a letter, a symbol, and/or a space as the one or more characters.

8. The method of claim 7, further comprising using different arrangements of the letter, the symbol, and/or the space as the one or more characters.

9. The method of claim 7, further comprising using identical arrangements of the letter, the symbol, and/or the space as the one or more characters.

10. The method of claim 1, further comprising using a plurality of strings as the key symbol string.

11. The method of claim 10, further comprising using fixed strings and variable length strings as the plurality of strings.

12. The method of claim 10, further comprising using different strings as the plurality of strings.

13. The method of claim 10, further comprising using a spacing between respective strings in the plurality of strings.

14. The method of claim 13, further comprising using one or more characters as the spacing.

15. The method of claim 13, further comprising using fixed or variable length spacing as the spacing.

16. The method of claim 1, further comprising using a plurality of key symbol strings as the key symbol string.

17. The method of claim 1, further comprising counting letters, symbols, spaces, and/or other characters to determine distances between respective adjacent positions of the key symbol string.

18. The method of claim 1, further comprising counting single or multiple character spaces to determine distances between respective adjacent positions of the key symbol string.

19. The method of claim 1, further comprising using a distance metric to represent line breaks to determine distances between respective adjacent positions of the key symbol string.

20. The method of claim 1, further comprising using a partial match of the target code in the sample passage of text as the successful determination.

21. The method of claim 1, further comprising using a complete match of the target code in the sample passage of text as the successful determination.

22. The method of claim 1, further comprising using user-defined matching criteria as the successful determination.

23. The method of claim 1, wherein the action comprises outputting a notification, disabling an imaging device, generating a visual signal, generating an audible signal, writing an entry into a log, sending a message to a remote system, or generating an automated invoice for royalties.

24. The method of claim 1, further comprising generating the sample passage of text by:
    imaging a document on an imaging device; and
    converting, using the processing device, at least a portion of the document into digital data.

25. The method of claim 1, further comprising:
    generating a sample code representative of a sample passage;
    comparing the target code with a first portion of the sample code;
    determining that the target passage occurs within the sample passage if the target code matches the first portion of the sample code;

comparing the target code with a second portion of the sample code; and determining that the target passage occurs within the sample passage if the target code matches the second portion of the sample code.

26. A system, comprising:
an imaging device configured to generate an image of a document;
a converting device configured to convert a portion of the image of the document into digital data;
an analyzing device configured to:
generate a sample from the digital data; and
compare a target code with a portion of the sample, wherein the target code is generated by:
identifying a key symbol string from a target passage of the text,
identifying a first position at which the key symbol string occurs within the target passage of the text,
identifying a second position at which the key symbol string occurs within the passage of the text, and
determining a distance between the first position and the second position; and
a controller configured to initiate an action upon determination that the portion of the sample includes the target code.

27. The system of claim 26, further comprising:
a memory device configured to store the target code.

28. The system of claim 26, wherein the controller is configured to initiate the action by: disabling the imaging device, generating a visual signal, generating an audible signal, writing an entry into a log, sending a message to a remote system, or generating an automated invoice for royalties.

29. The system of claim 28, wherein the remote system comprises:
a memory device configured to store the target code.

30. The system of claim 28, wherein the remote system comprises:
a second controller configured to initiate second action when the matching signal is received.

31. The system of claim 26, further comprising a printer coupled to the controller to produce physical copies of the image of the document.

32. The system of claim 26, wherein the converting device is an optical character recognition (OCR) device.

33. A tangible non-transitory computer-readable medium having stored thereon, computer-executable instructions that, if executed by a computing device, cause the computing device to perform a method comprising:
generating a target code from a target passage of text captured during electronic copying, photocopying, or scanning of a document; wherein the generating the target code comprises:
identifying a key symbol string from the target passage of the text,
identifying a first position at which the key symbol string occurs within the target passage of the text,
identifying a second position at which the key symbol string occurs within the target passage of the text, and
determining a distance between the first position and the second position;
determining whether a sample passage of text includes the target code; and upon successful determination, initiating an action if the sample passage of text includes the target code.

34. A computer program product comprising a non-transitory computer-useable medium having computer program logic recorded thereon, the computer program logic comprising:
first computer code means for generating a target code from a target passage of text captured during electronic copying, photocopying, of scanning of a document, wherein the first computer code means for generating the target code comprises:
second means for identifying a key symbol string from the target passage of the text,
third computer code means for identifying a first position at which the key symbol string occurs within the target passage of the text,
fourth computer code means for identifying a second position at which the key symbol string occurs within the target passage of the text, and
fifth computer code means for determining a distance between the first position and the second position;
sixth computer code means for determining whether a sample passage of text includes the target code; and
seventh computer code means for initiating an action if the sample passage of text includes the target code upon successful determination.

35. A method, comprising:
receiving, using a computing device, a key symbol string and a target passage of text that includes the key symbol string;
identifying, using the computing device, a first position at which the key symbol string occurs within the target passage of the text,
identifying, using the computing device, a second position at which the key symbol string occurs within the target passage of the text, wherein the second position is after the first position in the target passage of text,
identifying, using the computing device, a third position at which the key symbol string occurs within the target passage of the text, wherein the third position is after the second position it the target passage of text,
determining, using the computing device, a first distance, wherein the first distance is between the first position and the second position;
determining, using the computing device, a second distance, wherein the second distance is between the second position and the third position;
generating, using the computing device, a first target code, wherein the first target code includes pattern, and wherein the pattern includes the key symbol string, the first distance, and the second distance;
generating, using the computing device, a second target code based on a sample passage of text; and
initiating, using the computing device, an action based on a comparison of the first and second target codes.

36. The method of claim 35, wherein a format of the pattern comprises the key symbol string, a colon, the first distance, the second distance, and each subsequent distance after the second distance.

37. A system comprising: means for generating a target code from a target passage of text, wherein the target code includes a pattern, wherein the pattern includes a key symbol string, a first distance, and a second distance, and wherein the means for generating the target code comprises:
means for identifying the key symbol string from the target passage of the text, means for identifying a first position at which the key symbol string occurs within the target passage of the text;

means for identifying a second position at which the key symbol string occurs within the target passage of the text;

means for identifying a third position at which the key symbol string occurs within the target passage of the text;

means for determining the first distance, wherein the first, distance is between the first position and the second position;

means for determining the second distance, wherein the second distance is between the second position and the third position;

means for determining whether a sample passage of text includes the target code; and means for initiating an action if the sample passage of text includes the target code.

* * * * *